March 10, 1964  J. H. REAVES  3,124,762
CASCODE AMPLIFIER CIRCUITS
Filed Oct. 19, 1960
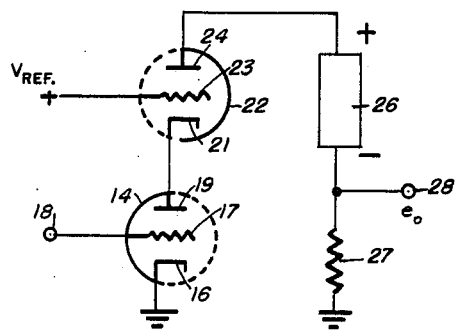
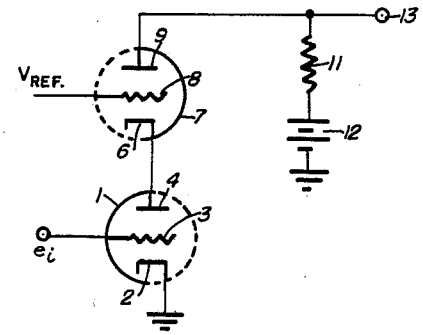
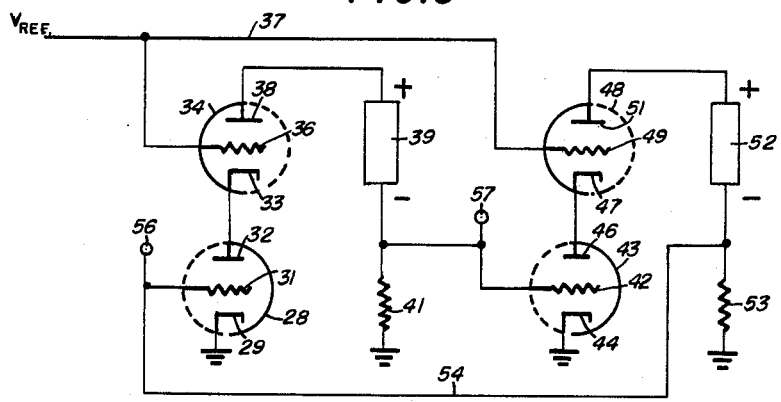
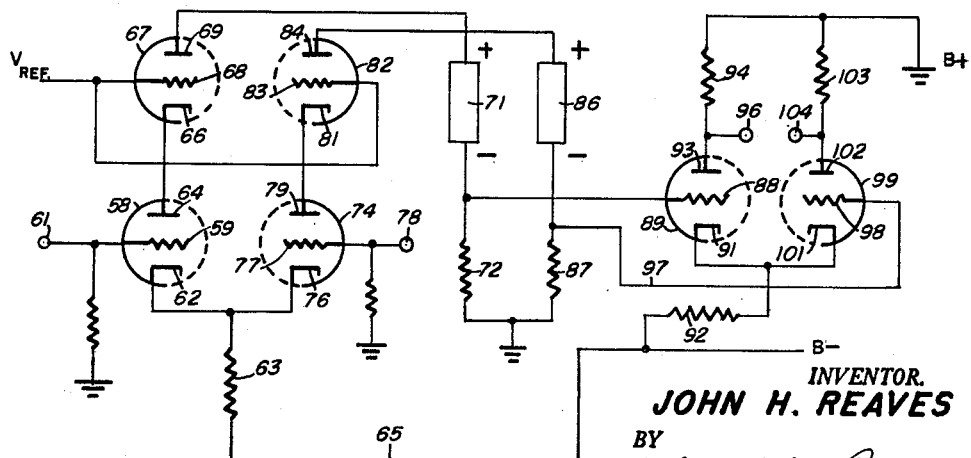
INVENTOR.
JOHN H. REAVES
BY
*Hurwitz & Rose*
ATTORNEYS

United States Patent Office 3,124,762
Patented Mar. 10, 1964

3,124,762
CASCODE AMPLIFIER CIRCUITS
John H. Reaves, Lexington, Mass., assignor to Elcor, Inc., Falls Church, Va., a corporation of Virginia
Filed Oct. 19, 1960, Ser. No. 63,673
5 Claims. (Cl. 330—70)

The present invention relates generally to amplifier circuits and more particularly to cascode amplifier circuits. This application is related to co-pending application Serial Number 842,935 filed September 28, 1959 by John H. Reaves for a Differential Amplifier and application Serial Number 787,889 filed January 20, 1959 by John F. Walton and John H. Reaves for Flip-Flop Circuits, now U.S. Patents No. 3,075,155 issued January 24, 1963, and No. 3,076,900 issued February 5, 1963, respectively.

Cascode circuits per se are well-known in the art and usually comprise a pair of series-connected triodes with a load resistor normally connected between the anode of the first of the triodes and an anode supply and the cathode of the second triode connected to ground either directly or through a bias resistor. The grid of the first triode is usually connected to a source of fixed potential and the input signal is applied to the grid of the second triode. The cathode of the first triode is connected to the plate of the second triode. The purpose of such an arrangement is to obtain with a triode the low input capacitance and high gain normally available only with a pentode, while eliminating the screen-grid to plate partition noise which one encounters in pentode circuits. Other reasons include the capability of utilizing certain triodes with characteristically high transconductance, and avoiding the need for a source of screen grid power.

In such a circuit the anode of the aforesaid second triode remains at a substantially constant potential and therefore, the output voltage of the system is equal to $R_1 G_{m2} e_g$ where $R_1$ is the load resistor—connected to the anode of the first triode, the $G_m$ is the transconductance of the second triode and $e_g$ is the amplitude of the signal applied to the grid of the second triode. Theoretically therefore, the circuit provides an output voltage which is directly proportional to the input signals since the values of $R_1$ and $G_m$ are relatively constant. In practice, however, particularly when the apparatus is employed in a D.C. amplifier the output voltage is also a function of incremental changes in the B-plus supply voltage for the system. Specifically, the voltage at the anode of the first triode is a function of the current through the load resistor, and is also a function of the instantaneous value of the anode power supply voltage. Therefore, in D.C. amplifier circuits it is necessary to employ a very well regulated anode power supply in order to minimize the effects of fluctuation in the power supply voltage.

In accordance with the present invention, there is provided a cascode amplifier circuit in which the output voltage is substantially completely independent of the power supply voltage over a reasonable range of variations therein. Specifically, the cascode circuit of the invention includes two triodes connected in series as in the prior art, with however, the anode power supply connected between the anode of the first triode, using the designations employed above, and the anode load resistor. In consequence, the output voltage, which is taken from the ungrounded end of the load resistor instead of from the plate of the first triode as in the conventional cascode circuit, is a function only of the value of the output load resistance and the current through the series circuit. Since this current, as indicated above, is a function only of the transconductance of the second triode and the input signal, the output signal is not affected by drift in the output voltage of the anode power supply. In order to eliminate signal degradation at high frequencies as a result of the shunt capacity to ground of the anode power supply, the supply employed may be of the type set forth in U.S. Patent No. 2,914,719, to John F. Walton and John F. Reaves. The shunt capacity to ground of this supply is of the order of twenty-five micro-microfarads so that the frequency response of the circuit can be maintained well into the megacycle range. To further extend the frequency response of the circuit, compensation circuits as set forth in the copending application Serial No. 777,037 filed November 28, 1958 by John H. Reaves and John F. Walton, now Patent No. 3,046,489 issued July 24, 1962.

The cascode amplifier circuit of the present invention may be employed in conjunction with flip-flop circuits set forth in the aforesaid Patent No. 3,076,900 so that the output signal voltages are substantially completely independent of the anode power supply voltages. Another advantage is that the timing of the transitions from one phase of the flip-flop output to the other is substantially independent of anode supply voltage variations.

The cascode amplifier of the present invention may also be employed with the differential amplifier circuit of the aforesaid Reaves Patent No. 3,075,155 to impart greater stability to the circuit and therefore render the output voltage a more accurate function of the input voltage than can be easily achieved with presently available circuits.

It is an object of the present invention to provide a cascode D.C. amplifier circuit in which the output voltage is substantially completely independent of the power supply voltage.

It is another object of the present invention to provide a cascode triode amplifier circuit having all the advantages of a conventional cascode amplifier circuit and having the further advantage that the D.C. output voltage is substantially completely independent of fluctuations in the anode power supply.

It is still another object of the present invention to provide a flip-flop circuit in which the switching function and output signals are substantially independent of the power supply voltage.

Still another object of the present invention is to provide a flip-flop circuit in which each stage of the flip-flop comprises a cascode amplifier the output voltage of which is substantially completely independent of fluctuations in the power supply voltage.

It is yet another object of the present invention to provide a differential amplifier which employs two balanced cascode amplifier subcircuits in which the differential output voltage of the amplifier is substantially completely independent of fluctuations in the power supply voltage.

The above and still further objects, features and advantages of the present invention will become apparent upon consideration of the following detailed description of one specific embodiment thereof, especially when taken in conjunction with the accompanying drawings, wherein:

FIGURE 1 is a circuit diagram of a prior art cascode amplifier circuit;

FIGURE 2 is a schematic circuit diagram of the cascode amplifier of the present invention;

FIGURE 3 is a schematic circuit diagram of a flip-flop circuit employing the cascode amplifier circuit of the present invention; and FIGURE 4 is a schematic circuit diagram of a differential amplifier employing the cascode amplifier circuit of the present invention.

Referring now specifically to FIGURE 1 of the accompanying drawings, which illustrates a prior art cascode amplifier circuit, there is provided a triode 1 having a grounded cathode 2, a control grid 3 and an anode 4. Although the cathode 2 is illustrated as connected directly to ground, it obviously may be connected through a bias resistor to ground or to any source of fixed reference potential other than ground so long as this reference potential is at a value relative to the voltage of the anode supply such as to produce operation of the circuit.

The anode 4 is connected directly to a cathode 6 of a second triode 7 which may constitute a second half of a dual triode comprising the sections 1 and 7. The triode 7 is provided with a control grid 8, connected to a suitable value of fixed reference potential, and an anode 9. The anode 9 is connected through a load resistor 11 to the positive terminal of an anode voltage supply 12 which for purposes of example only is illustrated as a battery. Obviously, the supply 12 may be a conventional A.C.-operated source of D.C. power. An input voltage is applied to the grid 3 of the triode 1 and the output voltage is taken from the anode 9 and appears at an output terminal 13.

As previously indicated, the circuit of FIGURE 1 is well-known in the prior art. The anode 4 of the triode 1 remains at a substantially fixed potential and the output voltage is equal to $R_1 G_m e_g$ where $R_1$ is the resistance of the resistor 11 and $G_m$ is the transconductance of the tube 1. However, since the output voltage is taken at the terminal 13, the total voltage at this terminal is a function of both the current through the resistor 11 and the voltage of the source 12. Therefore, variations in the output voltage of the source 12 appear as a part of the output signal and in order to minimize the effects of the supply a well-regulated power supply must be employed.

In accordance with the present invention, the difficulties experienced, particularly in a D.C. amplifier, with the cascode circuit of FIGURE 1, are eliminated by the circuit of the present invention illustrated in FIGURE 2 of the accompanying drawings. Referring specifically to FIGURE 2 a triode 14 has a cathode 16 connected to ground, control grid 17 connected to an input voltage terminal 18 and an anode 19. The anode 19 is connected directly to a cathode 21 of a triode 22 having a control grid 23 connected to a source of fixed potential (not illustrated), and an anode 24. The anode 24 is connected to the positive voltage terminal of an anode power supply 26 which may comprise a battery or preferably a power supply as set forth in the aforesaid U.S. Patent No. 2,914,719. The negative terminal of the power supply 26 is connected through a load resistor 27 to ground, and the output voltage is taken from a terminal 28 connected to the junction of the supply 26 and the resistor 27.

In this circuit, the current through the resistor 27 is a function of the value of the resistor 27 and the current flowing therethrough. The current flowing through the resistor 27 is, as indicated by the prior equation, a function only of the signal applied to the input terminal 18 and the transconductance of the triode 14. It will be noted that the voltage of the anode power supply 26 does not appear as a part of the output signal and the signal is substantially completely independent of fluctuations in the voltage of this supply. Consequently, the power supply need not be particularly well regulated, as in the prior art circuit. A further advantage of the circuit of FIGURE 2 is that the output voltage is near ground potential. Consequently, the output voltage may be coupled directly to the next stage, or, when employing feedback, to the input of the stage or preceding stages without requiring voltage dropping resistors or D.C. blocking capacitors. This results in A.C. coupling having a high degree of stability and wide band capabilities.

The basic circuit of FIGURE 2 has wide applicability as a part of other more sophisticated circuits such as those illustrated in FIGURES 3 and 4 of the accompanying drawings. Referring specifically to FIGURE 3, there is illustrated a flip-flop circuit which utilizes the low capacitance power supplies of the aforesaid patent connected between the anodes of the triodes of the flip-flop stages and their load resistors. A triode 28 has a grounded cathode 29, a grid 31, and an anode 32 connected directly to the cathode 33 of a second triode 34. The triode 34 further comprises a control grid 36 connected to a fixed voltage bus 37 and an anode 38 connected to a positive terminal of an anode power supply 39. The supply 39 has a negative terminal connected through a load resistor 41 to ground.

The junction of the resistor 41 and the supply 39 is connected to a grid 42 of a triode 43 having a grounded cathode 44 and an anode 46. The anode 46 is connected to a cathode 47 of the triode 48 having a grid 49 connected to the bus 37 and an anode 51. The anode 51 is connected to a positive terminal of an anode voltage supply 52 which has a negative terminal connected to ground through a resistor 53. The junction of the supply 52 and resistor 53 is connected to the grid 31 of tube 28 via a lead 54. Input switching pulses may be applied to input terminals 56 and 57 connected to the grids 31 and 42 respectively of the triodes 28 and 43. The circuit illustrated in FIGURE 3 is a basic circuit and many of the refinements which may normally be employed in flip-flop circuits are not illustrated for purposes of clarity of description. A complete set of circuits which may be employed with the present invention are illustrated in the aforesaid Patent No. 3,076,900. Further, the circuits may be modified to include appropriate timing capacitors so that they operate either as mono-stable multi-vibrators or alternatively as conventional multi-vibrator oscillators.

It is an important feature of the circuit of FIGURE 3 that the output signal voltages available across the resistors 41 and 53 are functions only of the current through their respective stages and are not influenced by voltage fluctuations of the sources 39 and 52. A further advantage of the circuit of FIGURE 3 results from the fact that the input signals are not seriously affected by input capacity or that the output signals which effect tube switching are independent of supply source variations. Consequently, the timing of the transition from one state to the other may be precisely controlled. In consequence, precise switching times can be achieved. More specifically, the build-up of voltage across the resistors 41 and 53 during a switching operation is a function only of the increase applied to associated control grids so that the switching voltages are always a function of the state of conduction only of their respective tubes and are not influenced by other circuit parameters.

Referring specifically to FIGURE 4 of the accompanying drawings, there is illustrated a differential amplifier of the general type disclosed in the aforesaid co-pending application Serial No. 842,935, now Patent No. 3,075,155 in which, however, cascode amplifier circuits of a type of the present invention are employed instead of single amplifier tube circuits. A triode 58 has a control grid 59 connected to an input terminal 61 and a cathode 62 connected through a resistor 63 to a negative voltage bus 65 in turn connected to a source of negative potential (not illustrated). The triode 58 further comprises an anode 64 connected directly to a cathode 66 of a triode 67 having a control grid 68 connected to a source of D.C. reference potential. The tube 67 further comprises an anode 69 connected to a positive terminal of a power supply 71 having a negative terminal connected through a resistor 72 to ground potential or other suitable source of fixed reference potential. A triode 74 has a cathode 76 connected to the cathode 62 of the triode 58 and further comprises a control grid 77 connected to a second differential input terminal 78. The triode 74 includes an anode 79 connected to a cathode 81 of a further triode 82. The triode 82 includes a grid 83 connected to the grid 68 of the triode 67 and an anode 84 connected to a positive terminal of an anode voltage supply 86. The anode voltage supply 86 has a negative terminal connected through a load resistor 87 to ground. The tubes 58 and 67 constitute a cascode amplifier in accordance with the present invention while the tubes 74 and 82 constitute a second cascode amplifier in accordance with the invention and the two cascode amplifiers constitute an input stage of a differential amplifier. The junction of the supply 71 and resistor 72 is connected to a grid 88 of a triode 89 having a cathode 91 connected through a resistor 92 to the bus 65. The tube 89 further includes an anode 93 connected through a load resistor 94 to ground. The anode 93 is also connected to one output terminal 96. The junction of the anode supply 86 and resistor 87 is connected via a lead 97 to a grid 98 of a triode 99, constituting the second half of the output stage of the two-stage differential amplifier. Tube 99 includes a cathode 101 connected to the cathode 91 of the triode 89 and an anode 102 connected through a load resistor 103 to ground potential. The anode 102 is also connected to a second output terminal 104.

The circuit of FIGURE 4 (which utilizes the basic circuit of FIGURE 2) in a manner more fully disclosed in the aforesaid Patent No. 3,075,155, permits one to obtain all of the advantages of employing supplies such as supplies 71 and 86 between the anodes and the load resistors without requiring a separate power supply for every tube of the amplifier. Specifically, by returning the cathode resistor 63 of the first stage of the amplifier to a large negative potential with respect to ground, the voltages at the two junctions of the load resistors 72 and 87 and their respective power supplies 71 and 86 are at such a large negative potential with respect to ground that by connecting the common cathode resistor 92 of the second stage of the amplifier to the bus 65, the anodes 93 and 102 of the tubes 89 and 99 may be returned to ground through their load resistors 94 and 103 respectively, to achieve an operating potential across the tubes without requiring additional anode power supplies. Thus, four amplifier sections operate with all of the advantages of the amplifiers set forth in the aforesaid U.S. Patent No. 2,914,719 while requiring only two individual power supplies.

In operation, upon the application of a differential input signal to the input terminals 61 and 78, a signal is applied to the grids 88 and 98 of the second stage of the amplifier such that the signals appearing at the output terminals 96 and 104 deviate from ground by an amount proportional to the input signal.

The utilization of cascode amplifiers in the first stage of the differential amplifier achieves all the advantages set forth above for the cascode amplifier of FIGURE 2, in addition to the advantages obtainable with the basic circuit as set forth in the aforesaid co-pending application. Specifically, the inter-electrode capacitance at the input of the circuit is relatively small approaching the order of magnitude of the pentode amplifier and therefore, the speed of response of the circuit is increased above the response that would be obtainable with a normal triode amplifier. Further, the circuit also achieves the advantages of employing floating power supplies such as supplies 71 and 86 in the first stage since the output voltages across the resistors 72 and 87 do not include the voltage of the supplies. The second stage of the amplifier obtains all of the advantages of the circuits employing floating power supplies without requiring individual supplies for each of the tubes since the anodes of the output tubes return directly to ground through the anode load resistors.

While I have described and illustrated one specific embodiment of my invention, it will be clear that variations of the details of construction which are specifically illustrated and described may be resorted to without departing from the true spirit and scope of the invention as defined in the appended claims.

I claim:

1. A cascode amplifier comprising first and second triodes, each having a cathode, an anode and a control grid, means connecting said cathode of said first triode to a reference potential, means connecting said anode of said first triode to said cathode of said second triode, means for applying an input signal to said control grid of said first triode, means for connecting said control grid of said second triode to a fixed operating potential to maintain said control grid of said second triode at a substantially invariable potential relative to the reference potential, a load impedance, means connecting one end of said load impedance to the reference potential means for connecting an anode supply voltage between the other end of said load impedance and said anode of said second triode a signal utilization means and a substantially purely resistive means connecting said signal utilization means to receive signal voltages developed across said load impedance.

2. A cascode amplifier comprising first and second amplifying elements each having a common electrode, an output electrode and a control electrode, means connecting said common electrode of said first amplifying element to a source of reference potential, means connecting said output electrode of said first amplifying element to said common electrode of said second amplifying element, means for applying an input signal to said control electrode of said first amplifying element, means for applying a fixed operating potential to said control electrode of said second amplifying element to maintain said control grid of said second amplifying element at a substantially invariable potential relative to the reference potential, a load impedance, means connecting an end of said load impedance to the reference potential means for connecting an output electrode supply voltage between the other end of said load impedance and said output electrode of said second amplifying element a signal utilization means and means for directly coupling said signal utilization means to the junction of said load impedance and the output electrode supply.

3. A cascode amplifier comprising first and second triodes each having an anode, a cathode and a control grid, a first load impedance, means connecting said triodes and said load impedance in series circuit with said cathode of said first triode and one end of said load impedance connected to a reference potential, means for connecting an anode supply voltage between the other end of said load impedance and said anode of said second triode, means for applying an input signal to the control grid of said first triode and means for applying a fixed operating potential to said control grid of said second triode to maintain said control grid of said second triode at a substantially invariable potential relative to the reference potential.

4. A differential amplifier comprising first and second triodes each having an anode, a cathode and a control grid, a first load impedance, means connecting said triodes and said load impedance in series circuit, means connecting said cathode of said first triode to a source of reference potential, means connecting one end of said first load impedance to said reference potential, means for connecting an anode supply voltage between the other end of said load impedance and said anode of said second triode, a second cascode amplifier comprising third and fourth triodes each having an anode, a cathode and a control grid, a second load impedance, means connecting said third and fourth triodes and said second load impedance in series circuit, means connecting said cathode of said third triode to said cathode of said first triode, means connecting one end of said second load impedance to said reference potential, means for maintaining said control grids of said second and fourth triodes at substantially invariable potentials relative to said reference potential, a differential signal utilization device, means for directly coupling said utilization device to said other ends of said first and second load impedances, respectively, and means for applying a differential input signal to said control grids of said first and third triodes.

5. A cascode amplifier comprising first and second triodes each having an anode, a cathode and a control grid, a first load impedance, means connecting said triodes and said load impedance in series circuit with said cathode of said first triode and one end of said load impedance connected to a reference potential, means for connecting an anode supply voltage between the other end of said load impedance and said anode of said second triode, means for applying an input signal to the control grid of said first triode, means for applying a fixed operating potential to said control grid of said second triode to maintain said control grid of said second triode at a fixed potential, a second cascode amplifier comprising third and fourth triodes each having an anode, a cathode and a control grid, a second load impedance, means connecting said third and fourth triodes and said second load impedance in series circuit with said cathode of said third triode and one end of said second load impedance connected to a reference potential, means for connecting an anode supply voltage between the other end of said second load impedance and said anode of said fourth triode, means for connecting said control grid of said fourth triode to fixed potential to maintain said control grid of said fourth triode at a substantially invariable potential relative to the reference potential, means for connecting said other end of said second load impedance to said control grid of said first triode, means for connecting said other end of said first load impedance to said control grid of said third triode and means for applying electrical signals to said control grid of at least one of said first and third triodes.

References Cited in the file of this patent

UNITED STATES PATENTS

| | | |
|---|---|---|
| 2,032,193 | White | Feb. 25, 1936 |
| 2,474,435 | Moore | June 28, 1949 |
| 2,585,639 | Elmore | Feb. 12, 1952 |

FOREIGN PATENTS

| | | |
|---|---|---|
| 172,350 | Great Britain | Mar. 23, 1921 |